United States Patent
Zhu

(10) Patent No.: US 12,402,033 B2
(45) Date of Patent: Aug. 26, 2025

(54) COMMUNICATIONS METHOD AND APPARATUS TO RESOLVE A PROBLEM OF HIGH SYSTEM OVERHEADS FOR TRANSMITTING A SYSTEM FRAME NUMBER IN THE CURRENT TECHNOLOGY

(71) Applicant: HUAWEI TECHNOLOGIES CO., LTD., Guangdong (CN)

(72) Inventor: Jiezuo Zhu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 415 days.

(21) Appl. No.: 17/954,970

(22) Filed: Sep. 28, 2022

(65) Prior Publication Data

US 2023/0032993 A1 Feb. 2, 2023

Related U.S. Application Data

(63) Continuation of application No. PCT/CN2020/082616, filed on Mar. 31, 2020.

(51) Int. Cl.
*H04W 28/06* (2009.01)
*H04L 1/00* (2006.01)

(52) U.S. Cl.
CPC .......... *H04W 28/06* (2013.01); *H04L 1/0009* (2013.01)

(58) Field of Classification Search
CPC ...... H04W 28/06; H04W 4/70; H04L 1/0009; H04L 5/0053; H04L 5/0094
See application file for complete search history.

(56) References Cited

U.S. PATENT DOCUMENTS

| | | | |
|---|---|---|---|
| 2016/0234857 A1* | 8/2016 | Chen | H04L 5/0044 |
| 2018/0083758 A1* | 3/2018 | Islam | H04L 27/2602 |
| 2019/0387505 A1* | 12/2019 | Ugurlu | H04W 72/23 |

FOREIGN PATENT DOCUMENTS

| | | | |
|---|---|---|---|
| CN | 104079392 A | 10/2014 |
| CN | 106612555 A | 5/2017 |
| CN | 107528671 A | 12/2017 |

(Continued)

OTHER PUBLICATIONS

Huawei et al., "Further consideration on cell identification in NR", 3GPP TSG-RAN WG4 Meeting NR#3, R4-1709620, Nagoya, Japan, Sep. 18-21, 2017, total 3 pages.

(Continued)

*Primary Examiner* — Walli Z Butt
(74) *Attorney, Agent, or Firm* — WOMBLE BOND DICKINSON (US) LLP

(57) ABSTRACT

This application relates to the field of communications technologies, and discloses a communications method and apparatus. The method includes: determining a number of a target time unit; and sending a plurality of pieces of identification information in a plurality of time units, where the plurality of pieces of identification information are used to indicate the number of the target time unit. Each of the plurality of pieces of identification information includes S bits, and the S bits include at least one first bit and at least one second bit. The at least one second bit included in one of the plurality of pieces of identification information and a combination of the at least one first bit included in the plurality of pieces of identification information are used to indicate the number of the target time unit.

20 Claims, 5 Drawing Sheets

(56) References Cited

FOREIGN PATENT DOCUMENTS

| | | | |
|---|---|---|---|
| CN | 108811073 | A | 11/2018 |
| CN | 109392132 | A | 2/2019 |
| CN | 110582113 | A | 12/2019 |
| EP | 3518591 | A1 | 7/2019 |
| WO | 2014205798 | A1 | 12/2014 |

OTHER PUBLICATIONS

ITL,"NR-PBCH design aspects", 3GPP TSG RAN WG1 Meeting #89, R1-1708328, Hangzhou, P.R. China May 15-19, 2017, total 10 pages.

* cited by examiner

COMMUNICATIONS METHOD AND APPARATUS TO RESOLVE A PROBLEM OF HIGH SYSTEM OVERHEADS FOR TRANSMITTING A SYSTEM FRAME NUMBER IN THE CURRENT TECHNOLOGY

CROSS-REFERENCE TO RELATED APPLICATIONS

This application is a continuation of International Application No. PCT/CN2020/082616, filed on Mar. 31, 2020, the disclosure of which is hereby incorporated by reference in its entirety.

TECHNICAL FIELD

This application relates to the field of communications technologies, and in particular, to the field of short-range communication, and may be applied to scenarios such as autonomous driving, intelligent driving, an intelligent cockpit, and a robot. This application provides a communications method and apparatus.

BACKGROUND

In a communications system, a system frame number (SFN) is widely used, for example, may be used for time synchronization between devices. A long term evolution (LTE) system is used as an example. Refer to FIG. 1. In the LTE system, a system frame number may be broadcast through a physical broadcast channel (PBCH). Information bits used to indicate the system frame number are usually 10 bits, that is, in a cycle from 0 to 1023. Only the higher (first) 8 bits of the information bits are broadcast in a master information block (MIB) of the PBCH, the remaining 2 bits are determined based on a position of a frame in a 40 ms cycle window of the PBCH. The first 10 ms frame is 00, the second 10 ms frame is 01, the third 10 ms frame is 10, and the fourth 10 ms frame is 11.

However, in some communications systems, return of the system frame number to zero (return of the system frame number from a maximum value to zero) is closely related to update of security key information of the system. That is, an update cycle of the security key is equal to a return-to-zero cycle of the system frame number. When the update cycle of the security key is long, a maximum frame number that the system is to support is very large. For example, a security key update cycle of a communications system is 30 min, and a frame cycle of the system is 1 ms. A quantity of frames processed by the system within 30 min is 30*60*1000=1800000. To carry a maximum number 1800000, the system frame number may be carried by using 21-bit data. To transmit the system frame number, a large quantity of time-frequency resources are required. This causes extremely high system overheads. Therefore, how to reduce system overheads caused by system frame number transmission becomes a problem urgently to be resolved.

SUMMARY

This application provides a communications method and apparatus, to resolve a problem of high system overheads for transmitting a system frame number in the current technology.

According to a first aspect, this application provides a communications method, and the method includes: determining a number of a target time unit; and sending a plurality of pieces of identification information in a plurality of time units, where the plurality of pieces of identification information are used to indicate the number of the target time unit. Each of the plurality of pieces of identification information includes S bits, and the S bits include at least one first bit and at least one second bit. The at least one second bit included in one of the plurality of pieces of identification information and a combination of the at least one first bit included in the plurality of pieces of identification information are used to indicate the number of the target time unit. In some embodiments, the plurality of time units include the target time unit. In this application, S is a positive integer. In a possible embodiment, S may be any integer between 8 and 18. For example, S may be 12 or 14.

In addition, in this application, the described communications method may be implemented by a network device, or may be implemented by a component of the network device, for example, implemented by a component such as a processing chip or a circuit in the network device. It should be understood that the time unit may be a frame, a hyper frame, a frame of another type, or the like. The number may be a frame number, a hyper frame number, or the like, or may be identification information such as an index number or a sequence number. In a possible embodiment, the number of the time unit may be used to indicate a system frame number of a communications system. For example, when the number of the time unit is a frame number of a frame or a hyper frame number of a hyper frame, the frame number or the hyper frame number is used as the system frame number of the communications system.

According to the foregoing method, a plurality of consecutive time units may be used as a time unit combination. A complete number (for example, a system frame number) of each time unit in the time unit combination does not need to be sent, but only identification information that includes partial number information of the time unit may be sent, to indicate a number of any time unit in the time unit combination. When applied to system frame number transmission, the method can effectively reduce an amount of data transmitted by using the system frame number, time-frequency resources required for system frame number transmission, and system overheads caused by system frame number transmission.

In a possible design, the plurality of time units include the $K^{th}$ time unit, a number of the $K^{th}$ time unit is indicated by using G bits, and at least one second bit in S bits included in the $K^{th}$ piece of identification information sent in the $K^{th}$ time unit is N bits in the G bits. In some embodiments, the N bits are the N least significant bits in the G bits. In this application, G and N are positive integers, and N is less than G. In a possible embodiment, G may be any integer between 20 and 32, and N may be any integer between 4 and 10. In some embodiments, N is an even number. For example, G may be 32, and N may be 8. In the foregoing design, the identification information includes the N least significant bits in the G bits of the number of the time unit, so that a receive end identifies each received time unit based on the least significant bits of the number.

In a possible design, the plurality of time units include the $K^{th}$ time unit, the number of the $K^{th}$ time unit is indicated by using G bits, and at least one first bit in the S bits included in the $K^{th}$ piece of identification information sent in the $K^{th}$ time unit is O bits in the G bits. In some embodiments, the O bits are some bits in the M most significant bits in the G bits. In this application, O and M are positive integers, O is less than M, and M is less than G. In a possible embodiment, M may be any integer between 16 and 28, and O may be any integer between 4 and 8. For example, M may be 24, and O may be 6. In the foregoing design, the identification information of the time unit includes only some bits in the M most significant bits in the number of the time unit. This can effectively reduce time-frequency resources required for transmission of the number of the time unit.

In a possible design, a sum of M and N is equal to G. In the foregoing design, integrity of transmitted number information is ensured, and this helps the receive end accurately parse the number.

In a possible design, the $K^{th}$ time unit is any one of the plurality of time units. In the foregoing design, identification information sent in any time unit is some bits in a number of the time unit. Compared with the current technology in which a number of a same quantity of bits is transmitted, fewer time-frequency resources are required. This reduces system overheads caused by number transmission.

In a possible design, the plurality of pieces of identification information include target identification information, and a scrambling code or an encoding scheme of the target identification information is different from that of other identification information. In the foregoing design, the plurality of pieces of identification information include the target identification information, and the scrambling code or the encoding scheme of the target identification information is different from that of other identification information. In this way, the receive end can determine, based on the target identification information with the different scrambling code or the encoding scheme, a plurality of time units that include the target time unit and whose identification information or numbers are associated with each other. This helps accurately determine a number of a time unit.

In another possible embodiment, each of the plurality of pieces of identification information may include Z bits, and a plurality of Z bit combinations included in the plurality of pieces of identification information are used to indicate the number of the target time unit. In this application, Z is a positive integer. In a possible embodiment, Z may be any integer between 4 and 10, and values of Z corresponding to different pieces of identification information may be the same or different. For example, both identification information 1 and identification information 2 include 6 (Z=6) bits; or identification information 1 includes 8 (Z=8) bits, and identification information 2 includes 4 (Z=4) bits. According to the foregoing method, a plurality of consecutive time units may be used as a time unit combination. A complete number (for example, a system frame number) of each time unit in the time unit combination does not need to be sent, but only identification information that includes partial number information of the time unit may be sent. This can reduce system overheads caused by number transmission.

In a possible design, the plurality of time units include the $K^{th}$ time unit, the number of the $K^{th}$ time unit is indicated by using G bits, and Z bits included in the $K^{th}$ piece of identification information sent in the $K^{th}$ time unit are some bits in the G bits. In some embodiments, the $K^{th}$ time unit is any one of the plurality of time units. In this application, G is a positive integer, and Z is less than G. In a possible embodiment, G may be any integer between 20 and 32. In the foregoing design, identification information sent in any time unit is some bits in a number of the time unit. Compared with the current technology in which a number of a same quantity of bits is transmitted, fewer time-frequency resources are required. This reduces system overheads caused by number transmission.

In a possible design, a sum of bit quantities of the plurality of Z bits included in the plurality of pieces of identification information is equal to G. In the foregoing design, integrity of transmitted number information is ensured, and this helps the receive end accurately parse the number.

According to a second aspect, this application provides a communications method, and the method includes: receiving a plurality of pieces of identification information in a plurality of time units, where the plurality of pieces of identification information are used to indicate a number of the target time unit, each of the plurality of pieces of identification information includes S bits, and the S bits include at least one first bit and at least one second bit; and determining the number of the target time unit based on the plurality of pieces of identification information, where the at least one second bit included in one of the plurality of pieces of identification information and a combination of the at least one first bit included in the plurality of pieces of identification information are used to indicate the number of the target time unit. In some embodiments, the plurality of time units include the target time unit. In this application, S is a positive integer. In a possible embodiment, S may be any integer between 8 and 18. For example, S may be 12 or 14.

In addition, in this application, the described communications method may be implemented by a terminal device, or may be implemented by a component of the terminal device, for example, implemented by a component such as a processing chip or a circuit in the terminal device. It should be understood that the time unit may be a frame, a hyper frame, a frame of another type, or the like. The number may be a frame number, a hyper frame number, or the like, or may be identification information such as an index number or a sequence number. In a possible embodiment, the number of the time unit may be used to indicate a system frame number of a communications system. For example, when the number of the time unit is a frame number of a frame or a hyper frame number of a hyper frame, the frame number or the hyper frame number is used as the system frame number of the communications system.

According to the foregoing method, a plurality of consecutive time units may be used as a time unit combination. A complete number (for example, a system frame number) of each time unit in the time unit combination does not need to be sent, but only identification information that includes partial number information of the time unit may be sent, to indicate a number of any time unit in the time unit combination. When applied to system frame number transmission, the method can effectively reduce an amount of data transmitted by using the system frame number, time-frequency resources required for system frame number transmission, and system overheads caused by system frame number transmission.

In a possible design, the plurality of time units include the $K^{th}$ time unit, a number of the $K^{th}$ time unit is indicated by using G bits, and at least one second bit in S bits included in the $K^{th}$ piece of identification information sent in the $K^{th}$ time unit is N bits in the G bits. In some embodiments, the N bits are the N least significant bits in the G bits. In this application, G and N are positive integers, and N is less than G. In a possible embodiment, G may be any integer between 20 and 32, and N may be any integer between 4 and 10. In some embodiments, N is an even number. For example, G may be 32, and N may be 8. In the foregoing design, the identification information includes the N least significant bits in the G bits of the number of the time unit, so that the terminal device identifies each received time unit based on the least significant bits of the number.

In a possible design, the plurality of time units include the $K^{th}$ time unit, the number of the $K^{th}$ time unit is indicated by using G bits, and at least one first bit in the S bits included in the $K^{th}$ piece of identification information sent in the $K^{th}$ time unit is O bits in the G bits. In some embodiments, the O bits are some bits in the M most significant bits in the G bits. In this application, O and M are positive integers, O is less than M, and M is less than G. In a possible embodiment, M may be any integer between 16 and 28, and O may be any integer between 4 and 8. For example, M may be 24, and O may be 6. In the foregoing design, the identification information of the time unit includes only some bits in the M most significant bits in the number of the time unit. This can effectively reduce time-frequency resources required for transmission of the number of the time unit.

In a possible design, a sum of M and N is equal to G. In the foregoing design, integrity of transmitted number information is ensured, and this helps the receive end accurately parse the number.

In a possible design, the $K^{th}$ time unit is any one of the plurality of time units. In the foregoing design, identification information sent in any time unit is some bits in a number of the time unit. Compared with the current technology in which a number of a same quantity of bits is transmitted, fewer time-frequency resources are required. This reduces system overheads caused by number transmission.

In a possible design, the plurality of pieces of identification information include target identification information, and a scrambling code or an encoding scheme of the target identification information is different from that of other identification information. In the foregoing design, the plurality of pieces of identification information include the target identification information, and the scrambling code or the encoding scheme of the target identification information is different from that of other identification information. In this way, the terminal device can determine, based on the target identification information with the different scrambling code or the encoding scheme, a plurality of time units that include the target time unit and whose identification information or numbers are associated with each other. This helps the terminal device accurately determine a number of a time unit.

In another possible embodiment, each of the plurality of pieces of identification information may include Z bits, and a plurality of Z bit combinations included in the plurality of pieces of identification information are used to indicate the number of the target time unit. In this application, Z is a positive integer. In a possible embodiment, Z may be any integer between 4 and 10, and values of Z corresponding to different pieces of identification information may be the same or different. For example, both identification information 1 and identification information 2 include 6 (Z=6) bits; or identification information 1 includes 8 (Z=8) bits, and identification information 2 includes 4 (Z=4) bits. According to the foregoing method, a plurality of consecutive time units may be used as a time unit combination. A complete number (for example, a system frame number) of each time unit in the time unit combination does not need to be sent, but only identification information that includes partial number information of the time unit may be sent. This can reduce system overheads caused by number transmission.

In a possible design, the plurality of time units include the $K^{th}$ time unit, the number of the $K^{th}$ time unit is indicated by using G bits, and Z bits included in the $K^{th}$ piece of identification information sent in the $K^{th}$ time unit are some bits in the G bits. In some embodiments, the $K^{th}$ time unit is any one of the plurality of time units. In this application, G is a positive integer, and Z is less than G. In a possible embodiment, G may be any integer between 20 and 32. In the foregoing design, identification information sent in any time unit is some bits in a number of the time unit. Compared with the current technology in which a number of a same quantity of bits is transmitted, fewer time-frequency resources are required. This reduces system overheads caused by number transmission.

In a possible design, a sum of the plurality of Z bits included in the plurality of pieces of identification information is equal to G. In the foregoing design, integrity of transmitted number information is ensured, and this helps a receive end accurately parse the number.

According to a third aspect, an embodiment of this application provides a communications apparatus. The apparatus has a function of implementing the method according to any one of the first aspect or the possible designs of the first aspect. The function may be implemented by hardware, or by hardware by executing corresponding software. The hardware or the software includes one or more modules (or units) corresponding to the foregoing functions, for example, a transceiver unit and a processing unit.

In a possible design, the apparatus may be a chip or an integrated circuit.

In a possible design, the apparatus includes a processor and a transceiver. The processor is coupled to the transceiver, to implement a function in the method according to any one of the first aspect or the possible designs of the first aspect. The apparatus may further include a memory, and the memory stores a program that may be executed by the processor to implement the function in the method according to any one of the first aspect or the possible designs of the first aspect.

In a possible design, the apparatus may be a network device.

According to a fourth aspect, an embodiment of this application provides a communications apparatus. The apparatus has a function of implementing the method according to any one of the second aspect or the possible designs of the second aspect. The function may be implemented by hardware, or by hardware by executing corresponding software. The hardware or the software includes one or more modules (or units) corresponding to the foregoing functions, for example, a transceiver unit and a processing unit.

In a possible design, the apparatus may be a chip or an integrated circuit.

In a possible design, the apparatus includes a processor and a transceiver. The processor is coupled to the transceiver, to implement a function in the method according to any one of the second aspect or the possible designs of the second aspect. The apparatus may further include a memory, and the memory stores a program that may be executed by the processor to implement the function in the method according to any one of the second aspect or the possible designs of the second aspect.

In a possible design, the apparatus may be a terminal device.

According to a fifth aspect, an embodiment of this application provides a communications system. The communications system may include a network device and a terminal device, where the network device may perform the method according to any one of the first aspect or the possible designs of the first aspect, and the terminal device may perform the method according to any one of the second aspect or the possible designs of the second aspect.

According to a sixth aspect, an embodiment of this application provides a computer-readable storage medium. The computer-readable storage medium stores instructions to perform the method according to any one of the first aspect or the possible designs of the first aspect, or the method according to any one of the second aspect or the possible designs of the second aspect.

According to a seventh aspect, an embodiment of this application further provides a computer program product, including a computer program or instructions. When the computer program or the instructions are executed, the method according to any one of the first aspect or the possible designs of the first aspect may be implemented, or the method according to any one of the second aspect or the possible designs of the second aspect may be implemented.

According to an eighth aspect, this application further provides a chip, configured to implement the method according to any one of the first aspect or the possible designs of the first aspect, or implement the method according to any one of the second aspect or the possible designs of the second aspect.

For technical effects that can be achieved in the third aspect to the eighth aspect, refer to the technical effects that can be achieved in the first aspect and the second aspect. Details are not described herein again.

DESCRIPTION OF EMBODIMENTS

Figure 1:
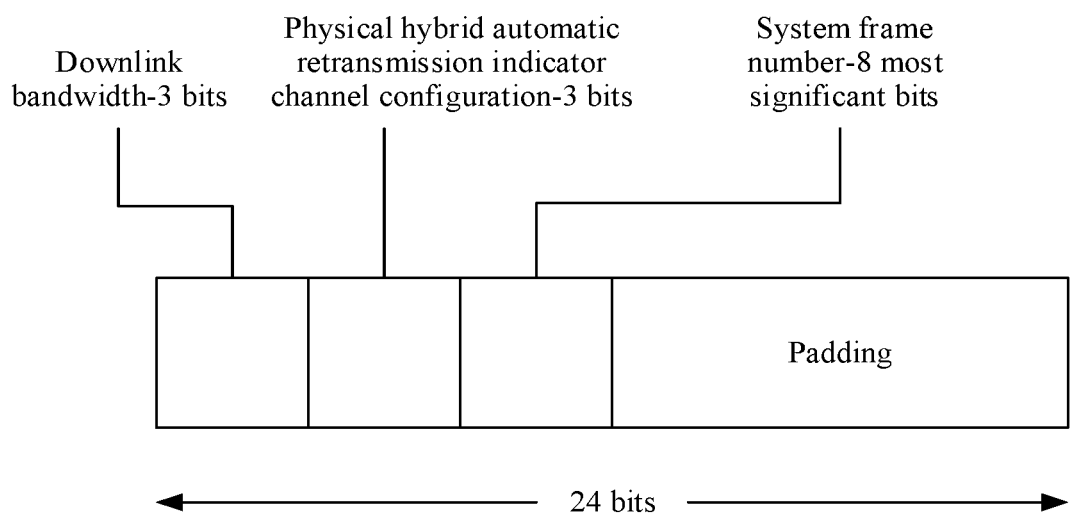
FIG. 1 is a schematic diagram of content of a system broadcast message in an LTE system.
Figure 2:
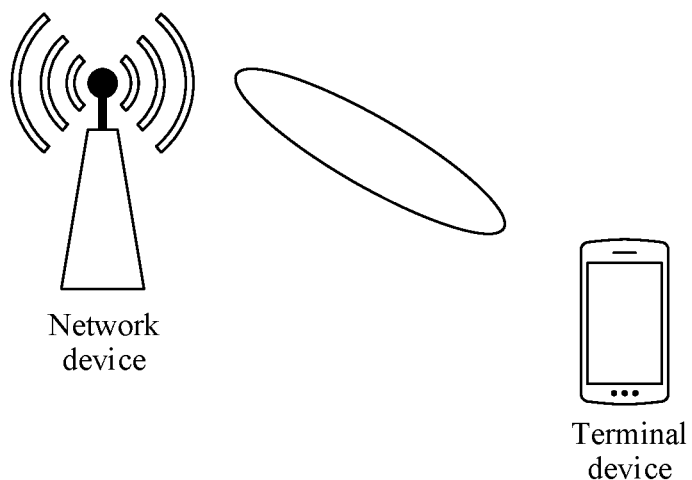
FIG. 2 is a schematic diagram of a communications architecture according to an embodiment of this application.

Technical solutions of embodiments of this application may be applied to various communications systems. For example, the technical solutions may be applied to communications systems such as an LTE system, a long term evolution-advanced (LTE-A) system, and a fifth generation (5G) communications system; and may also be extended to related cellular systems such as wireless fidelity (Wi-Fi) and worldwide interoperability for microwave access (WiMAX), and to a future communications system, for example, a 6G system. Specifically, a scenario to which embodiments of this application are applied may be shown in FIG. 2, including a network device and a terminal device, and the network device and the terminal device may communicate with each other. It should be noted that a quantity of network devices and a quantity of terminal devices in the communications system shown in FIG. 2 are not limited in embodiments.

Before embodiments of this application are described, some terms in this application are first described, to help a person skilled in the art have a better understanding.

(1) Terminal device: The terminal device includes a device that provides voice and/or data connectivity for a user. Specifically, the terminal device includes a device that provides voice for the user, or includes a device that provides data connectivity for the user, or includes a device that provides voice and data connectivity for the user. For example, the terminal device may include a handheld device having a wireless connection function or a processing device connected to a wireless modem. The terminal device may communicate with a core network through a radio access network (RAN), and exchange voice or data with the RAN, or exchange voice and data with the RAN. The terminal device may include user equipment (UE), a wireless terminal device, a mobile terminal device, a device-to-device (D2D) communications terminal device, a vehicle-to-everything (V2X) terminal device, a machine-to-machine/machine type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, a portable, pocket-sized, handheld, or computer built-in mobile apparatus, or the like. For example, the terminal device may be a device such as a personal communications service (PCS) phone, a cordless telephone set, a session initiation protocol (SIP) phone, a wireless local loop (WLL) station, or a personal digital assistant (PDA). The terminal device may alternatively include a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner.

By way of example but not limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, such as glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and may collaboratively work with other devices such as smartphones, for example, various smart bands, smart helmets, or smart jewelry for monitoring physical signs.

If the various terminal devices described above are located on a vehicle (for example, placed in the vehicle or installed in the vehicle), the terminal devices all may be considered as in-vehicle terminal devices. The in-vehicle terminal devices are also referred to as, for example, on-board units (OBU).

In embodiments of this application, the terminal device may further include a relay. Alternatively, it may be understood that any device that can perform data communication with a base station may be considered as a terminal device.

In embodiments of this application, an apparatus configured to implement a function of the terminal device may be a terminal device, or may be an apparatus that can support the terminal device in implementing the function, for example, a chip system. The apparatus may be installed in the terminal device. In this embodiment of this application, the chip system may include a chip, or may include a chip and another discrete component. In the technical solutions provided in embodiments of this application, an example in which the apparatus for implementing the function of the terminal device is a terminal device is used to describe the technical solutions provided in embodiments of this application.

(2) Network device: The network device includes, for example, an access network (AN) device such as a base station (for example, an access point), and may be a device that communicates with a wireless terminal device through an air interface by using one or more cells in an access network. Alternatively, for example, a network device in a vehicle-to-everything (V2X) technology is a roadside unit (RSU). The base station may be configured to mutually convert a received over-the-air frame and an IP packet, and serve as a router between the terminal device and a remaining part of the access network. The remaining part of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (NodeB, eNB, or e-NodeB) in a long term evolution (LTE) system or a long term evolution-advanced (LTE-A) system, or may include a next generation NodeB (gNB) in a 5th generation (5G) mobile communications technology new radio (NR) system (also briefly referred to as an NR system), or may include a centralized unit (CU) and a distributed unit (DU) in a cloud radio access network (Cloud RAN) system. This is not limited in embodiments of this application.

The network device may further include a core network device, and the core network device includes, for example, an access and mobility management function (AMF).

In embodiments of this application, the network device may alternatively be a cockpit domain controller (CDC), a vehicle or the like equipped with the cockpit domain controller, or a chip in the cockpit domain controller (when the network device is a chip, the network device may be referred to as a control apparatus). The cockpit domain controller may be an in-vehicle product equipped with intelligence and networking, and may perform intelligent interaction with a person, a road, and a vehicle over the cockpit domain controller. The cockpit domain controller CDC may communicate with an in-vehicle terminal and a non-in-vehicle terminal (such as a mobile phone and a sensor).

In embodiments of this application, an apparatus configured to implement a function of a network device may be a network device, or may be an apparatus, for example, a chip system, that can support the network device in implementing the function. The apparatus may be installed in the network device. In the technical solutions provided in embodiments of this application, an example in which an apparatus for implementing a function of a network device is a network device is used to describe the technical solutions provided in embodiments of this application.

This application aims to resolve a problem in the current technology that a large quantity of time-frequency resources are required and system overheads are high when a system frame number is transmitted. In addition, it should be understood that the term "for example" in embodiments of this application is used to represent giving an example, an illustration, or a description. Any embodiment or design scheme described as an "example" in this application should not be explained as being more preferred or having more advantages than another embodiment or design scheme. Exactly, the term "example" is used to present a concept in a specific manner. The terms "include/comprise" and "have" in embodiments, claims, and accompanying drawings of this application are not exclusive. For example, a process, a method, a system, a product, or a device including a series of operations or modules is not limited to the listed operations or modules, and may further include operations or modules that are not listed. In addition, unless otherwise stated, ordinal numbers such as "first" and "second" in embodiments of this application are for distinguishing between a plurality of objects, but are not intended to limit an order, a time sequence, priorities, or importance of the plurality of objects. "A plurality of" in this application means two or more.

The following describes in detail embodiments of this application with reference to accompanying drawings.

Figure 3:
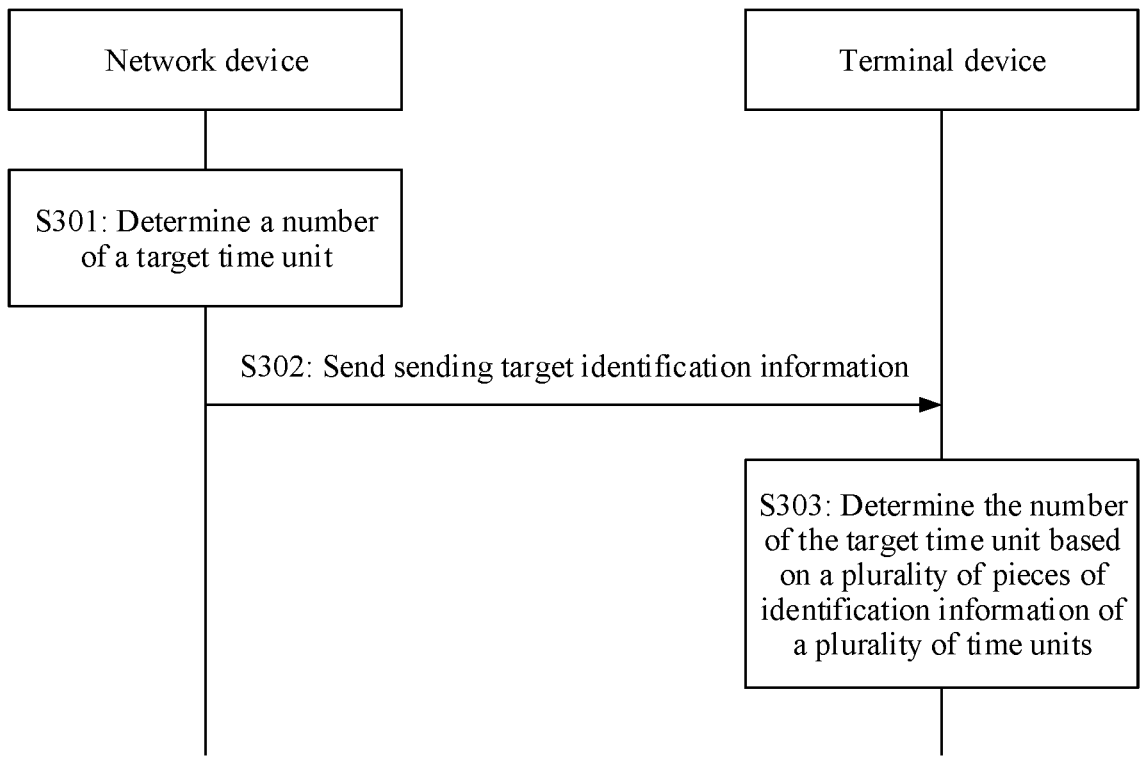
FIG. 3 is a schematic diagram of a communication process according to an embodiment of this application.

FIG. 3 is a schematic diagram of a communication process according to an embodiment of this application. The process includes the following operations.

S301: A network device determines a number of a target time unit.

It should be understood that, in this embodiment of this application, the time unit may be a frame, a hyper frame, a frame of another type, or the like. The number may be a frame number, a hyper frame number, or the like, or may be identification information such as an index number or a sequence number. In an example, the frame may be a basic unit of downlink transmission and uplink transmission. For example, one frame may include A (for example, three) symbols used for downlink transmission and B (for example, four) symbols used for uplink transmission. The hyper frame may be a combination of a plurality of frames. In some embodiments, structures of different hyper frames may be symmetric. For example, one hyper frame may include 48 consecutive frames, and the third frame included in each of the plurality of hyper frames may be a special frame of a same type. A specific structure of the hyper frame and a specific structure of the frame are not limited in this application.

In a possible embodiment, a number return-to-zero cycle may be preconfigured or predefined by using a protocol. The network device may determine a number of each time unit in the number return-to-zero cycle based on a quantity of time units in the number return-to-zero cycle. For example, the number return-to-zero cycle is 30 min, a time unit cycle is 1 ms, a number (decimal) of the first time unit of the network device in the number return-to-zero cycle is 0, a number of the second time unit is 1, a number of the third time unit is 2, a number of the fourth time unit is 3, and so on. A person skilled in the art may learn that numbering manners are various. In this application, the foregoing examples are merely used for explanation and description, and a specific numbering rule is not limited. However, in a same number return-to-zero cycle, numbers of time units are not repeated.

S302: The network device sends target identification information to a terminal device in the target time unit, and the terminal device receives the target identification information.

The target identification information includes S bits, and the S bits include at least one first bit and at least one second bit. It should be noted that, for ease of describing the solution, in this application, the identification information and the number are described in a binary manner, that is, in a manner of a plurality of bits.

For example, a number of a time unit is carried by using data of G (G=21) bits, and a most significant bit to a least significant bit are sequentially as follows: $b_{20}$, $b_{19}$, $b_{18}$, . . . , $b_2$, $b_1$, and $b_0$. When a number return-to-zero cycle is 30 min and a time unit cycle is 1 ms, numbers of time units are shown in Table 1.

Table 1

TABLE 1

| Time unit | Number ($b_{20}$, $b_{19}$, $b_{18}$, . . . , $b_2$, $b_1$, and $b_0$) |
|---|---|
| Time unit 0 | 0000 0000 0000 0000 00000 |
| Time unit 1 | 0000 0000 0000 0000 00001 |
| Time unit 2 | 0000 0000 0000 0000 00010 |
| . . . | |
| Time unit 1799997 | 1101 1011 1011 1001 11101 |
| Time unit 1799998 | 1101 1011 1011 1001 11110 |
| Time unit 1799999 | 1101 1011 1011 1001 11111 |

Refer to Table 1. In the number return-to-zero cycle, for any two adjacent time units, a number of a latter time unit is increased by 1 compared with a number of a previous time unit. Based on this, to reduce time-frequency resources required for number transmission, in a possible embodiment, the G bits of the number may be divided into a plurality of subparts, and a plurality of consecutive time units are used as a time unit combination. A quantity of time units in a time unit combination is the same as a quantity of subparts obtained by dividing the G bits of the number, and the time units are in a one-to-one correspondence with the subparts.

When transmitting the numbers of the time units, the network device may send, in each time unit in a time unit combination, only data of a number subpart corresponding to the time unit as identification information of the time unit. The terminal device may determine a number of each time unit in the time unit combination, based on the received data of the number subpart in each time unit in the time unit combination and based on a relationship that in the number return-to-zero cycle, a number of a latter time unit in any two adjacent time units is increased by 1 compared with a number of a previous time unit. This can reduce resource overheads caused by number transmission.

For example, the G (G=21) bits of the number are divided into four subparts, and four consecutive time units are used as a time unit combination (that is, the four consecutive time units are used as a number determining cycle). Refer to Table 2. A time unit A corresponds to a subpart 1: $b_8$, $b_7$, $b_6$, $b_5$, $b_4$, $b_3$, $b_2$, $b_1$, and $b_0$ in the G bits of the number; a time unit B corresponds to a subpart 2: $b_{12}$, $b_{11}$, $b_{10}$, and $b_9$ in the G bits of the number; a time unit C corresponds to a subpart 3: $b_{16}$, $b_{15}$, $b_{14}$, and $b_{13}$ in the G bits of the number; and a time unit D corresponds to a subpart 4: $b_{20}$, $b_{19}$, $b_{18}$, and $b_{17}$ in the G bits of the number.

For example, after determining that a number of the time unit A is 1799990 (decimal), and bit data corresponding to the number is 1101 1011 1011 1001 10110 ($b_{20}$ to $b_0$), the network device sends identification information 100110110 ($b_8$ to $b_0$) of the time unit A in the time unit A. After determining that a number of the time unit B is 1799991 and bit data corresponding to the number is 1101 1011 1011 1001 10111, the network device sends identification information 1011 ($b_{12}$ to $b_9$) of the time unit B in the time unit B. After determining that a number of the time unit C is 1799992 and bit data corresponding to the number is 1101 1011 1011 1001 11000, the network device sends identification information 1011 ($b_{16}$ to $b_{13}$) of the time unit C in the time unit C. After determining that a number of the time unit D is 1799993 and bit data corresponding to the number is 1101 1011 1011 1001 11001, the network device sends identification information 1101 ($b_{20}$ to $b_{17}$) of the time unit D in the time unit D.

In the number return-to-zero cycle, for any two adjacent time units, a number of a latter time unit is increased by 1 compared with a number of a previous time unit. Therefore, after the terminal device respectively receives the identification information of the time unit A, the identification information of the time unit B, the identification information of the time unit C, and the identification information of the time unit D in the time unit A, the time unit B, the time unit C, and the time unit D, the terminal device may determine data on $b_8$ to $b_0$ in the number of the time unit B by adding 1 to the data on $b_8$ to $b_0$ in the number of the time unit A, determine data on $b_{12}$ to $b_0$ in the number of the time unit C by adding 1 to data on $b_{12}$ to $b_0$ in the number of the time unit B, determine data on $b_{16}$ to $b_0$ in the number of the time unit D by adding 1 to data on $b_{16}$ to $b_0$ in the number of the time unit C, and determine the complete number ($b_{20}$ to $b_0$) of the time unit D with reference to the data on $b_{20}$ to $b_{17}$ in the number of the time unit D. The numbers of the time unit C, the time unit B, and the time unit A may be determined by sequentially subtracting 1 from the number of the time unit D.

TABLE 2

| Time unit | Bit content | Sending sequence |
|---|---|---|
| Time unit A (X) | $b_8$, $b_7$, $b_6$, $b_5$, $b_4$, $b_3$, $b_2$, $b_1$, $b_0$ | 1 |
| Time unit B (X + 1) | $b_{12}$, $b_{11}$, $b_{10}$, $b_9$ | 2 |
| Time unit C (X + 2) | $b_{16}$, $b_{15}$, $b_{14}$, $b_{13}$ | 3 |
| Time unit D (X + 3) | $b_{20}$, $b_{19}$, $b_{18}$, $b_{17}$ | 4 |

The terminal device usually distinguishes between received time units based on a least significant bit part in a received time unit number. In another possible embodiment, the network device may divide a number of a time unit (G bits) into two parts. A first part is a most significant bit part (M bits) of the number, that is, the M most significant (first) bits of the number. The second part is a least significant bit part (N bits) of the number, that is, the N least significant (last) bits of the number. Only the first part is divided into a plurality of subparts (O bits), and data on the second part (the least significant bit part) of the number is sent in each time unit in the time unit combination. To be specific, identification information (S bits) sent in any time unit includes some bits (for example, O bits) of the first part of the number of the time unit and the second part (N bits) of the number. In some embodiments, G, M, N, and O are all positive integers not less than 1, where M+N=G, and O<M.

For example, the number of the time unit is G (G=21) bits, the first part of the number is M (M=16) bits, the second part of the number is N (N=5) bits, and four consecutive time units are used as one time unit combination. The first part, M bits (that is, the first 16 bits of the 21 bits of the number), of the number of the time unit are: $b_{20}$, $b_{19}$, $b_{18}$, . . . , $b_7$, $b_6$, and $b_5$. The second part, N bits (that is, the last 5 bits of the 21 bits of the number), of the number of the time unit are:

$b_4$, $b_3$, $b_2$, $b_1$, and $b_0$. The first part, M bits, of the number of the time unit may be divided into four subparts: a subpart 1: $b_8$, $b_7$, $b_6$, and $b_5$; a subpart 2: $b_{12}$, $b_{11}$, $b_{10}$, and $b_9$; a subpart 3: $b_{16}$, $b_{15}$, $b_{14}$, and $b_{13}$; and a subpart 4: $b_{20}$, $b_{19}$, $b_{18}$, and $b_{17}$. For example, the time unit combination still includes four consecutive time units: the time unit A, the time unit B, the time unit C, and the time unit D. Refer to Table 3. The network device sends $b_8$, $b_7$, $b_6$, $b_5$, and $b_4$, $b_3$, $b_2$, $b_1$, $b_0$ in the number (G=21) of the time unit A in the time unit A. The network device sends $b_{12}$, $b_{11}$, $b_{10}$, $b_9$, and $b_4$, $b_3$, $b_2$, $b_1$, $b_0$ in the number (G=21) of the time unit B in the time unit B. The network device sends $b_{16}$, $b_{15}$, $b_{14}$, $b_{13}$, and $b_4$, $b_3$, $b_2$, $b_1$, $b_0$ in the number (G=21) of the time unit C in the time unit C. The network device sends $b_{20}$, $b_{19}$, $b_{18}$, $b_{17}$, and $b_4$, $b_3$, $b_2$, $b_1$, $b_0$ in the number (G=21) of the time unit D in the time unit D.

TABLE 3

| Time unit | Bit content | Sending sequence |
|---|---|---|
| Time unit A (X) | $b_8$, $b_7$, $b_6$, $b_5$, and $b_4$, $b_3$, $b_2$, $b_1$, $b_0$ | 1 |
| Time unit B (X + 1) | $b_{12}$, $b_{11}$, $b_{10}$, $b_9$, and $b_4$, $b_3$, $b_2$, $b_1$, $b_0$ | 2 |
| Time unit C (X + 2) | $b_{16}$, $b_{15}$, $b_{14}$, $b_{13}$, and $b_4$, $b_3$, $b_2$, $b_1$, $b_0$ | 3 |
| Time unit D (X + 3) | $b_{20}$, $b_{19}$, $b_{18}$, $b_{17}$, and $b_4$, $b_3$, $b_2$, $b_1$, $b_0$ | 4 |

For example, in a time unit combination (that is, a number determining cycle), after determining that the number of the time unit A is 1799990 (decimal), and bit data corresponding to the number is 1101 1011 1011 1001 10110 ($b_{20}$ to $b_0$), the network device sends identification information 1001 ($b_8$ to $b_5$) and 10110 ($b_4$ to $b_0$) of the time unit A in the time unit A. After determining that the number of the time unit B is 1799991 and bit data corresponding to the number is 1101 1011 1011 1001 10111, the network device sends identification information 1011 ($b_{12}$ to $b_9$) and 10111 ($b_4$ to $b_0$) of the time unit B in the time unit B. After determining that the number of the time unit C is 1799992 and bit data corresponding to the number is 1101 1011 1011 1001 11000, the network device sends identification information 1011 ($b_{16}$ to $b_{13}$) and 11000 ($b_4$ to $b_0$) of the time unit C in the time unit C. After determining that the number of the time unit D is 1799993 and the bit data corresponding to the number is 1101 1011 1011 1001 11001, the network device sends identification information 1101 ($b_{20}$ to $b_{17}$) and 11001 ($b_4$ to $b_0$) of the time unit D in the time unit D.

It should be understood that, in this embodiment of this application, a quantity of time units included in a time unit combination, a number (G bits), a first part (M bits) of the number, a second part (N bits) of the number, and a quantity of sub-parts (O bits) obtained by dividing the first part can be set or defined as required. For example, the number of the time unit is indicated by using 32 bits. The first part (a most significant bit part) of the number is 25 bits, and the second part (a least significant bit part) of the number is 7 bits. The first part is divided into five subparts, and each subpart is 5 bits. For example, the time unit combination includes five consecutive time units: a time unit A, a time unit B, a time unit C, a time unit D, and a time unit E. In this case, the network device sends $b_{11}$, $b_{10}$, $b_9$, $b_8$, $b_7$, and $b_6$, $b_5$, $b_4$, $b_3$, $b_2$, $b_1$, $b_0$ in a number (G=32) of the time unit A in the time unit A. The network device sends $b_{16}$, $b_{15}$, $b_{14}$, $b_{13}$, $b_{12}$, and $b_6$, $b_5$, $b_4$, $b_3$, $b_2$, $b_1$, $b_0$ in a number (G=32) of the time unit B in the time unit B. The network device sends $b_{21}$, $b_{20}$, $b_{19}$, $b_{18}$, $b_{17}$, and $b_6$, $b_5$, $b_4$, $b_3$, $b_2$, $b_1$, $b_0$ in a number (G=32) of the time unit C in the time unit C. The network device sends $b_{26}$, $b_{25}$, $b_{24}$, $b_{23}$, $b_{22}$, and $b_6$, $b_5$, $b_4$, $b_3$, $b_2$, $b_1$, $b_0$ in a number (G=32) of the time unit D in the time unit D. The network device sends $b_{31}$, $b_{30}$, $b_{29}$, $b_{28}$, $b_{27}$, and $b_6$, $b_5$, $b_4$, $b_3$, $b_2$, $b_1$, $b_0$ in the number (G=32) of the time unit E in the time unit E.

In an example, the network device may send the identification information of the time unit in the time unit in a broadcast manner or another manner of scheduling. In some embodiments, the broadcast manner may include a manner such as multicast or unicast of a PBCH, an MIB, or a system information block (SIB). For example, the identification information of the time unit is broadcast over a PBCH, or the identification information of the time unit is sent by using a radio resource control (RRC) message (signaling). Multicast, also referred to as multileaving, is a point-to-multipoint communications technology, and may also be referred to as a multicast transmission method or a multicast transmission technology. Unicast is a point-to-point communications technology.

S303: The terminal device determines the number of the target time unit based on a plurality of pieces of identification information of a plurality of time units.

The plurality of time units include the target time unit, the target identification information belongs to the plurality of pieces of identification information, and the plurality of pieces of identification information are used to indicate the number of the target time unit.

For example, after receiving the identification information 1001 ($b_8$ to $b_5$) and 10110 ($b_4$ to $b_0$) of the time unit A, the identification information 1011 ($b_{12}$ to $b_9$) and 10111 ($b_4$ to $b_0$) of the time unit B, the identification information 1011 ($b_{16}$ to $b_{13}$) and 11000 ($b_4$ to $b_0$) of the time unit C, and the identification information 1101 ($b_{20}$ to $b_{17}$) and 11001 ($b_4$ to $b_0$) of the time unit D in the time unit combination (the number determining cycle), the terminal device may determine data (1001 10111) on $b_8$ to $b_0$ in the number of the time unit B by adding 1 to the data (1001 10110) on $b_8$ to $b_0$ in the number of the time unit A, determine data (1011 1001 11000) on $b_{12}$ to $b_0$ in the number of the time unit C by adding 1 to data (1011 1001 10111) on $b_{12}$ to $b_0$ in the number of the time unit B, determine data (1011 1011 1001 11001) on bib to $b_0$ in the number of the time unit D by adding 1 to data (1011 1011 1001 11000) on bib to $b_0$ in the number of the time unit C, and may obtain bzo to $b_0$ (1101 1011 1011 1001 11001) in the number of the time unit D with reference to the data (1101) on $b_{20}$ to biz in the number of the time unit D. The number (1101 1011 1011 1001 11000) of the time unit C, the number (1101 1011 1011 1001 10111) of the time unit B, and the number (1101 1011 1011 1001 10110) of the time unit A may be determined by sequentially subtracting 1 from the number of the time unit D. In other words, based on a combination of some bits in a first part of a number of a time unit included in the plurality of time units in the time unit combination (the number determining cycle) and a second part of a number of any time unit in the time unit combination, the number of any time unit in the time unit combination can be indicated.

In addition, to help the terminal device identify the plurality of time units in the time unit combination (the number determining cycle), in a possible embodiment, the network device may use a scrambling code or an encoding scheme different from that of other identification information for one piece of identification information in a plurality of pieces of identification information corresponding to one time unit combination.

For example, a time unit combination (a number determining cycle) includes four consecutive time units: a time unit A, a time unit B, a time unit C, and a time unit D. When respectively sending identification information of the time unit A, identification information of the time unit B, identification information of the time unit C, and identification information of the time unit D in the time unit A, the time unit B, the time unit C, and the time unit D, the network device may scramble the identification information of the time unit A by using a scrambling code x, and may scramble the identification information of the time unit B, the identification information of the time unit C, and the identification information of the time unit D by using a scrambling code y. After the terminal device receives the identification information of the time unit A scrambled by using the scrambling code x, the terminal device determines, based on a sending sequence 1 of the identification information of the time unit A scrambled by using the scrambling code x in the time unit combination (the number determining cycle), that the identification information of the time unit B, the identification information of the time unit C, and the identification information of the time unit D that are received after the identification information of the time unit A is received and the identification information of the time unit A are identification information of four time units in one time unit combination.

In addition, to ensure accuracy of number-related data transmission, in addition to number-related data, identification information of each time unit may include other information, for example, a cyclic redundancy check (CRC) code corresponding to the number-related data. In addition, interleaving encoding or the like may be further performed on number-related data (S bits) in identification information of each time unit, to improve accuracy of number-related data transmission.

It should be noted that, after the interleaving encoding is performed, substantive values of a plurality of pieces of identification information that are sent in a plurality of time units and that include a plurality of bits may not be actual numbers of the plurality of time units. However, a person skilled in the art may know that, content indicated by the plurality of pieces of identification information carried in the plurality of time units is essentially still numbers of the time units in the plurality of time units. Regardless of whether interleaving encoding or another possible encoding scheme is performed on the identification information herein, it is still described that each piece of identification information includes the foregoing plurality of bits mentioned in this application.

The foregoing mainly describes the solutions provided in this application from a perspective of interaction between the network device and the terminal device. It may be understood that, to implement the foregoing functions, each network element includes a corresponding hardware structure and/or software module (or unit) for performing each function. A person skilled in the art should easily be aware that, in combination with units and algorithm operations of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the embodiment goes beyond the scope of this application.

Figure 4:
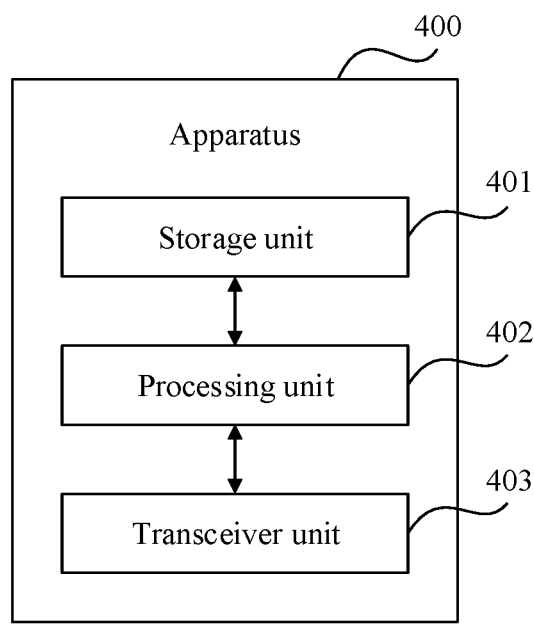
FIG. 4 is a schematic block diagram of a communications apparatus according to an embodiment of this application.

When an integrated unit (module) is used, FIG. 4 shows a possible example block diagram of a communications apparatus according to an embodiment of this application. The apparatus 400 may exist in a form of software. The apparatus 400 may include a processing unit 402 and a transceiver unit 403.

In a possible design, the processing unit 402 is configured to implement a corresponding processing function. The transceiver unit 403 is configured to support communication between the apparatus 400 and another network entity. In some embodiments, the transceiver unit 403 may include a receiving unit and/or a sending unit, which are respectively configured to perform a receiving operation and a sending operation. In some embodiments, the apparatus 400 may further include a storage unit 401, configured to store program code and/or data of the apparatus 400.

The apparatus 400 may be the network device in any one of the foregoing embodiments, or may be a component such as a chip or an integrated circuit disposed in the network device. The processing unit 402 may support the apparatus 400 in performing actions of the network device in the foregoing method examples. Alternatively, the processing unit 402 mainly performs internal actions of the network device in the method examples, and the transceiver unit 403 supports communication between the apparatus 400 and the terminal device.

For example, in an embodiment, the processing unit 402 is configured to determine a number of a target time unit. The transceiver unit 403 is configured to send a plurality of pieces of identification information in a plurality of time units, where the plurality of pieces of identification information are used to indicate the number of the target time unit. Each of the plurality of pieces of identification information includes S bits, and the S bits include at least one first bit and at least one second bit. The at least one second bit included in one of the plurality of pieces of identification information and a combination of the at least one first bit included in the plurality of pieces of identification information are used to indicate the number of the target time unit.

In a possible design, the plurality of time units include the target time unit.

In a possible design, the plurality of time units include the $K^{th}$ time unit, a number of the $K^{th}$ time unit is indicated by using G bits, and at least one second bit in S bits included in the $K^{th}$ piece of identification information sent in the $K^{th}$ time unit is N bits in the G bits. In some embodiments, the N bits are the N least significant bits in the G bits.

In a possible design, the plurality of time units include the $K^{th}$ time unit, the number of the $K^{th}$ time unit is indicated by using G bits, and at least one first bit in the S bits included in the $K^{th}$ piece of identification information sent in the $K^{th}$ time unit is O bits in the G bits. In some embodiments, the O bits are some bits in the M most significant bits in the G bits.

In a possible design, a sum of M and N is equal to G.

In a possible design, the $K^{th}$ time unit is any one of the plurality of time units.

In a possible design, the plurality of pieces of identification information include target identification information, and a scrambling code or an encoding scheme of the target identification information is different from that of other identification information.

Figure 5:
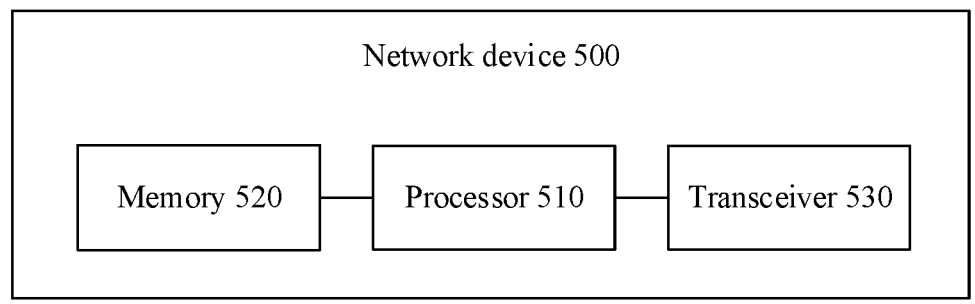
FIG. 5 is a schematic block diagram of a network device according to an embodiment of this application.

As shown in FIG. 5, an embodiment of this application further provides a network device 500. The network device 500 includes a processor 510 and a transceiver 530, and may further include a memory 520. In this embodiment of this application, the transceiver may be a transceiver, a bus, a bus interface, a pin, a communications interface, or another apparatus, circuit, or component that can implement a communication function. This is not limited in this embodiment of this application.

In a possible design, the memory 520 stores instructions, a program, or data, and the memory 520 may be configured to implement the function of the storage unit 401 in the foregoing embodiment. The processor 510 is configured to read the instructions, program, or data stored in the memory 520. When the instructions or the program stored in the memory 520 is executed, the processor 510 is configured to perform an operation performed by the processing unit 402 in the foregoing embodiment, and the transceiver 530 is configured to perform an operation performed by the transceiver unit 403 in the foregoing embodiment.

It should be understood that the apparatus 400 or the network device 500 in embodiments of this application may correspond to the network device in the communications method (FIG. 3) in embodiments of this application, and operations and/or functions of the modules in the apparatus 400 or the network device 500 are separately used to implement corresponding procedures of the method in FIG. 3. For brevity, details are not described herein again.

Figure 6:
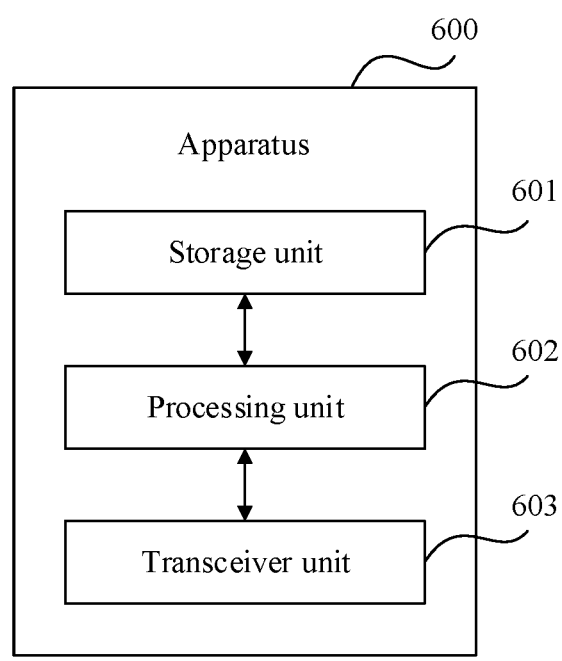
FIG. 6 is another schematic block diagram of a communications apparatus according to an embodiment of this application.

When an integrated unit (module) is used, FIG. 6 shows a possible example block diagram of a communications apparatus according to an embodiment of this application. The apparatus 600 may exist in a form of software. The apparatus 600 may include a processing unit 602 and a transceiver unit 603.

In a possible design, the processing unit 602 is configured to implement a corresponding processing function. The transceiver unit 603 is configured to support communication between the apparatus 600 and another network entity. In some embodiments, the transceiver unit 603 may include a receiving unit and/or a sending unit, which are respectively configured to perform a receiving operation and a sending operation. In some embodiments, the apparatus 600 may further include a storage unit 601, configured to store program code and/or data of the apparatus 600.

The apparatus 600 may be the terminal device in any one of the foregoing embodiments, or may be a chip or another component disposed in the terminal device. The processing unit 602 may support the apparatus 600 in performing actions of the terminal device in the foregoing method examples. Alternatively, the processing unit 602 mainly performs internal actions of the terminal device in the method examples, and the transceiver unit 603 supports communication between the apparatus 600 and the network device.

For example, in an embodiment, the transceiver unit 603 is configured to receive a plurality of pieces of identification information in a plurality of time units, where the plurality of pieces of identification information are used to indicate a number of a target time unit, each of the plurality of pieces of identification information includes S bits, and the S bits include at least one first bit and at least one second bit. The processing unit 602 is configured to determine the number of the target time unit based on the plurality of pieces of identification information. The at least one second bit included in one of the plurality of pieces of identification information and a combination of the at least one first bit included in the plurality of pieces of identification information are used to indicate the number of the target time unit. In some embodiments, the plurality of time units include the target time unit.

In a possible design, the plurality of time units include the $K^{th}$ time unit, a number of the $K^{th}$ time unit is indicated by using G bits, and at least one second bit in S bits included in the $K^{th}$ piece of identification information sent in the $K^{th}$ time unit is N bits in the G bits. In some embodiments, the N bits are the N least significant bits in the G bits.

In a possible design, the plurality of time units include the $K^{th}$ time unit, the number of the $K^{th}$ time unit is indicated by using G bits, and at least one first bit in the S bits included in the $K^{th}$ piece of identification information sent in the $K^{th}$ time unit is O bits in the G bits. In some embodiments, the O bits are some bits in the M most significant bits in the G bits.

In a possible design, a sum of M and N is equal to G.

In a possible design, the $K^t$ time unit is any one of the plurality of time units.

In a possible design, the plurality of pieces of identification information include target identification information, and a scrambling code or an encoding scheme of the target identification information is different from that of other identification information.

Figure 7:
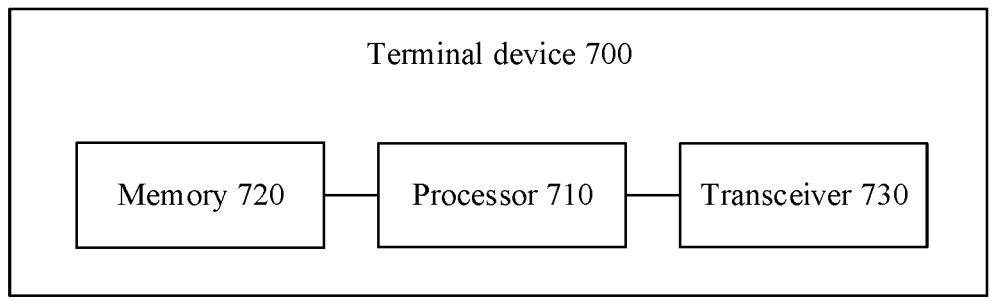
FIG. 7 is a schematic block diagram of a terminal device according to an embodiment of this application.

As shown in FIG. 7, an embodiment of this application further provides a terminal device 700. The terminal device 700 includes a processor 710 and a transceiver 730, and may further include a memory 720. In this embodiment of this application, the transceiver may be a transceiver, a bus, a bus interface, a pin, a communications interface, or another apparatus, circuit, or component that can implement a communication function. This is not limited in this embodiment of this application.

In a possible design, the memory 720 stores instructions, a program, or data, and the memory 720 may be configured to implement the function of the storage unit 601 in the foregoing embodiment. The processor 710 is configured to read the instructions, program, or data stored in the memory 720. When the instructions or the program stored in the memory 720 is executed, the processor 710 is configured to perform an operation performed by the processing unit 602 in the foregoing embodiment, and the transceiver 730 is configured to perform an operation performed by the transceiver unit 603 in the foregoing embodiment.

It should be understood that the apparatus 600 or the terminal device 700 in embodiments of this application may correspond to the terminal device in the communications method (FIG. 3) in embodiments of this application, and operations and/or functions of the modules in the apparatus 600 or the terminal device 700 are separately used to implement corresponding procedures of the method in FIG. 3. For brevity, details are not described herein again.

An embodiment of this application further provides a communications apparatus. The communications apparatus may be a terminal device, or may be a chip or a circuit in a terminal device. The communications apparatus may be configured to implement operations performed by the terminal device in the foregoing method embodiment.

Figure 8:
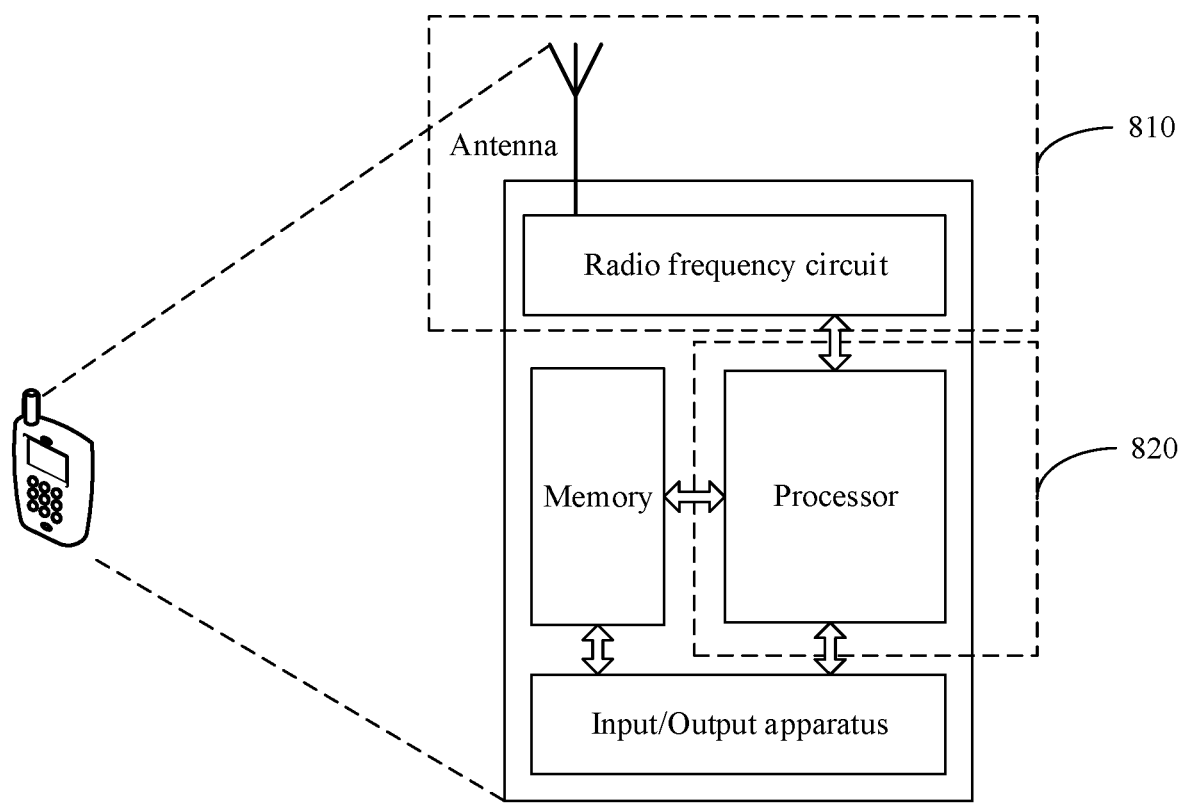
FIG. 8 is a schematic diagram of a structure of a terminal device according to an embodiment of this application.

When the communications apparatus is a terminal device, FIG. 8 shows a simplified schematic diagram of a structure of the terminal device. For ease of understanding and convenience of figure illustration, an example in which the terminal device is a mobile phone is used in FIG. 8. As shown in FIG. 8, the terminal device includes a processor, a memory, a radio frequency circuit, an antenna, and an input and output apparatus. The processor is mainly configured to: process a communications protocol and communications data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user. It should be noted that some types of terminal devices may not have the input/output apparatus.

When sending data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 8 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in embodiments of this application.

In embodiments of this application, the antenna and the radio frequency circuit that have a transceiver function may be considered as a transceiver unit (or a communications unit) of the terminal device, and the processor having a processing function may be considered as a processing unit of the terminal device. As shown in FIG. 8, the terminal device includes a transceiver unit 810 and a processing unit 820. The transceiver unit may also be referred to as a transceiver, a transceiver machine, a transceiver apparatus, or the like. The processing unit may also be referred to as a processor, a processing board, a processing module, a processing apparatus, or the like. In some embodiments, a component that is in the transceiver unit 810 and that is configured to implement a receiving function may be considered as a receiving unit, and a component that is in the transceiver unit 810 and that is configured to implement a sending function may be considered as a sending unit. In other words, the transceiver unit 810 includes the receiving unit and the sending unit.

It should be understood that the transceiver unit 810 is configured to perform a sending operation and a receiving operation on a terminal device side in the foregoing method embodiment, and the processing unit 820 is configured to perform an operation other than the receiving and sending operations of the terminal device in the foregoing method embodiment.

For example, in an embodiment, the transceiver unit 810 is configured to perform the receiving operation on the terminal device side in S302 in FIG. 3, and/or the transceiver unit 810 is further configured to perform another receiving and sending operations on the terminal device side in embodiments of this application. The processing unit 820 is configured to perform the processing operation on the terminal device side in S303 in FIG. 3, and/or the processing unit 820 is further configured to perform another processing operation on the terminal device side in embodiments of this application.

In another form of this embodiment, a computer-readable storage medium is provided. The computer-readable storage medium stores a program or instructions. When the program or instructions are executed, the method on the terminal device side in the foregoing method embodiment may be performed.

In another form of this embodiment, a computer program product that includes instructions is provided. When the instructions are executed, the method on the terminal device side in the foregoing method embodiment may be performed.

In another form of this embodiment, a chip is provided to implement the method on the terminal device side in the foregoing method embodiment.

Figure 9:
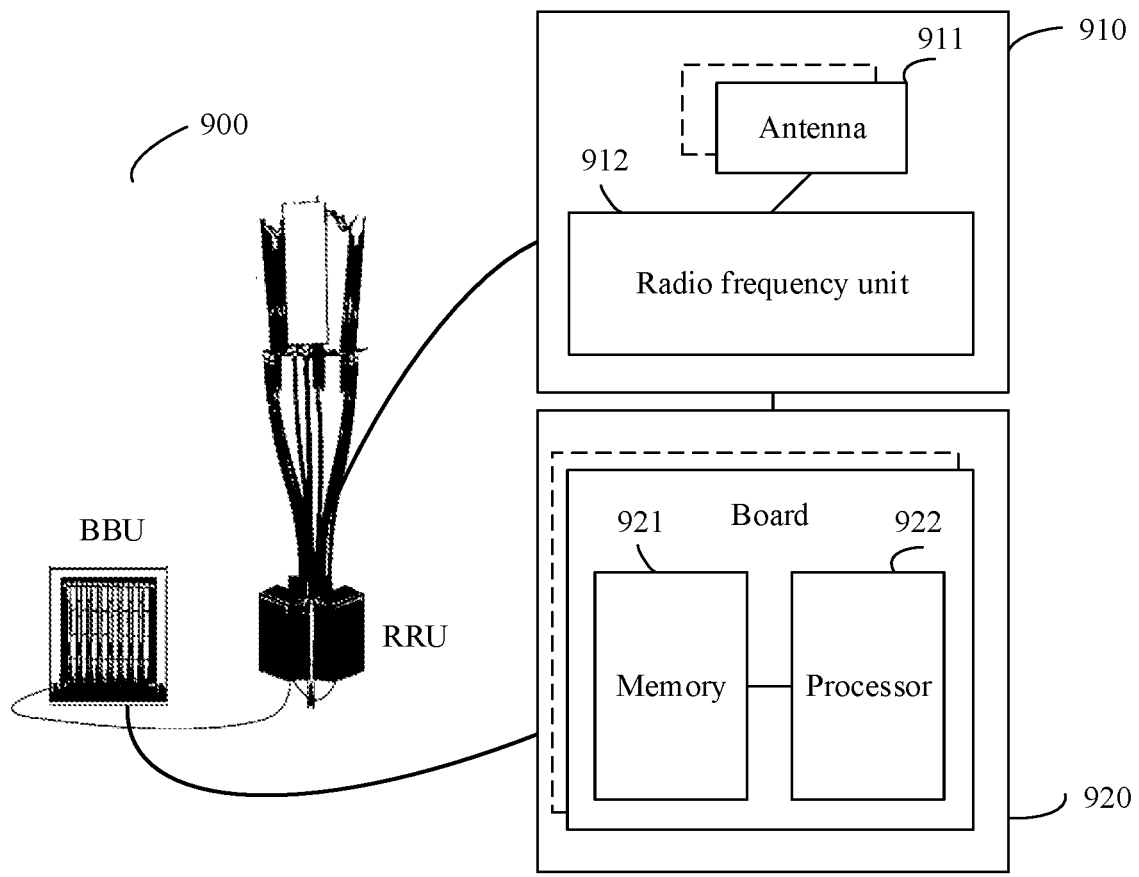
FIG. 9 is a schematic diagram of a structure of a network device according to an embodiment of this application.

When the apparatus in this embodiment is a network device, the network device may be shown in FIG. 9. An apparatus 900 includes one or more radio frequency units, for example, a remote radio unit (RRU) 910 and one or more baseband units (BBU) (which may also be referred to as a digital unit, digital unit, DU) 920. The RRU 910 may be referred to as a transceiver unit, and corresponds to the transceiver unit 403 in FIG. 4. In some embodiments, the transceiver unit may also be referred to as a transceiver, a transceiver circuit, a transceiver, or the like, and may include at least one antenna 911 and a radio frequency unit 912. The RRU 910 is mainly configured to: receive and send radio frequency signals, and perform conversion between a radio frequency signal and a baseband signal, for example, configured to send configuration information to a terminal device. The BBU 920 is mainly configured to perform baseband processing, control a base station, and so on. The RRU 910 and the BBU 920 may be physically disposed together, or may be physically disposed separately, namely, a distributed base station.

The BBU 920 is a control center of the base station, and may also be referred to as a processing module. The BBU 920 may correspond to the processing unit 402 in FIG. 4, and is mainly configured to implement a baseband processing function, for example, channel coding, multiplexing, modulation, or spreading. For example, the BBU (the processing module) may be configured to control the base station to perform an operation procedure related to the network device in the foregoing method embodiment, for example, generate the foregoing indication information.

In an example, the BBU 920 may include one or more boards, and a plurality of boards may jointly support a radio access network (for example, an LTE network) in a single access standard, or may separately support radio access networks (for example, an LTE network, a 5G network, and another network) in different access standards. The BBU 920 further includes a memory 921 and a processor 922. The memory 921 is configured to store instructions and data. The processor 922 is configured to control the base station to perform actions, for example, configured to control the base station to perform an operation procedure related to the network device in the foregoing method embodiment. The memory 921 and the processor 922 may serve one or more boards. In other words, a memory and a processor may be disposed on each board. Alternatively, a plurality of boards may share a same memory and a same processor. In addition, a circuit may further be disposed on each board.

In another form of this embodiment, a computer-readable storage medium is provided. The computer-readable storage medium stores a program or instructions. When the program or instructions are executed, the method on a network device side in the foregoing method embodiment may be performed.

In another form of this embodiment, a computer program product that includes instructions is provided. When the instructions are executed, the method on the network device side in the foregoing method embodiment may be performed.

In another form of this embodiment, a chip is provided. The chip may implement the method on the network device side in the foregoing method embodiment.

In another form of this embodiment, an intelligent device or a transport tool is provided, for example, an uncrewed transport vehicle, a robot, an uncrewed aerial vehicle, or a vehicle. The communications apparatus shown in FIG. 4 and/or FIG. 6 is disposed on the intelligent device or the transport vehicle.

It should be noted that, the processor in embodiments of this application may be an integrated circuit chip, and has a signal processing capability. In an embodiment, operations in the foregoing method embodiment can be implemented by using a hardware integrated logical circuit in the processor, or by using instructions in a form of software. The processor may be a general-purpose central processing unit (CPU), a general-purpose processor, digital signal processing (DSP), an application-specific integrated circuit (ASIC), a field programmable gate array (FPGA), another programmable logic device, a transistor logic device, a hardware component, or any combination thereof; or may be a combination of processors implementing a computing function, for example, a combination of one or more microprocessors or a combination of a DSP and a microprocessor. The general-purpose processor may be a microprocessor, or the processor may be any conventional processor or the like.

It may be understood that the memory or storage unit in embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM). It should be noted that the memory of the systems and methods described in this specification includes but is not limited to these and any memory of another proper type.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs or instructions. When the computer programs or the instructions are loaded and executed on a computer, the procedures or the functions according to embodiments of this application are all or partially implemented. The computer may be a general-purpose computer, a dedicated computer, a computer network, or another programmable apparatus. The computer programs or the instructions may be stored in a computer-readable storage medium, or may be transmitted over the computer-readable storage medium. The computer-readable storage medium may be any usable medium accessible by a computer, or a data storage device such as a server integrating one or more usable media. The usable medium may be a magnetic medium, for example, a floppy disk, a hard disk, or a magnetic tape; or may be an optical medium, for example, a DVD; or may be a semiconductor medium, for example, a solid-state drive (SSD).

The various illustrative logical units and circuits described in embodiments of this application may implement or operate the described functions by using a general-purpose processor, a digital signal processor, an application-specific integrated circuit (ASIC), a field-programmable gate array (FPGA) or another programmable logical apparatus, a discrete gate or transistor logic, a discrete hardware component, or a design of any combination thereof. The general-purpose processor may be a microprocessor. In some embodiments, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Operations of the methods or algorithms described in embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor, so that the processor can read information from the storage medium and write information into the storage medium. Alternatively, the storage medium may be integrated into a processor. The processor and the storage medium may be disposed in an ASIC, and the ASIC may be disposed in a terminal device. In some embodiments, the processor and the storage medium may be alternatively disposed in different components of the terminal device.

These computer program instructions may alternatively be loaded onto the computer or the another programmable data processing device, so that a series of operation operations are performed on the computer or the another programmable device to generate computer-implemented processing, and instructions executed on the computer or the another programmable device provide operations for implementing a function specified in one or more procedures in the flowchart and/or one or more blocks in the block diagram.

Although embodiments of this application are described with reference to specific features, it is clear that various modifications and combinations may be made to them without departing from the spirit and scope of embodiments of this application. Correspondingly, the specification and the accompanying drawings are merely example descriptions of embodiments of this application that are defined by the appended claims, and are considered to cover any or all of modifications, variations, combinations, or equivalents in the scope of embodiments of this application.

What is claimed is:

1. A communications method, comprising:
   determining a number of a target time unit; and
   sending a plurality of pieces of identification information in a plurality of time units, wherein the plurality of pieces of identification information are used to indicate the number of the target time unit, wherein the number of target time unit represents an index of the target time unit amongst the plurality of times units as part of identification information of the target time unit, wherein each of the plurality of pieces of identification information comprises S bits, and the S bits comprise at least one first bit and at least one second bit; and the at least one second bit comprised in one of the plurality of pieces of identification information and a combination of the at least one first bit comprised in the plurality of pieces of identification information are used to indicate the number of the target time unit.

2. The method according to claim 1, wherein the plurality of time units comprise the target time unit.

3. The method according to claim 1, wherein the plurality of time units comprise a $K^{th}$ time unit, a number of the $K^{th}$ time unit is indicated by using G bits, and the at least one second bit in the S bits comprised in a $K^{th}$ piece of identification information of the plurality of pieces of identification information sent in the $K^{th}$ time unit is N bits in the G bits.

4. The method according to claim 1 wherein the plurality of time units comprise a $K^{th}$ time unit, the number of the $K^{th}$ time unit is indicated by using G bits, and the at least one first bit in the S bits comprised in a $K^{th}$ piece of identification information of the plurality of pieces of identification information sent in the $K^{th}$ time unit is O bits in the G bits.

5. The method according to claim 1, wherein the plurality of pieces of identification information comprise target identification information, and a scrambling code or an encoding scheme of the target identification information is different from that of other identification information of the plurality of pieces of identification information.

6. A communications apparatus comprising:
a processor configured to determine a number of a target time unit; and
a transceiver configured to send a plurality of pieces of identification information in a plurality of time units, wherein the plurality of pieces of identification information are used to indicate the number of the target time unit, wherein the number of target time unit represents an index of the target time unit amongst the plurality of times units as part of identification information of the target time unit, wherein each of the plurality of pieces of identification information comprises S bits, and the S bits comprise at least one first bit and at least one second bit; and the at least one second bit comprised in one of the plurality of pieces of identification information and a combination of the at least one first bit comprised in the plurality of pieces of identification information are used to indicate the number of the target time unit.

7. The communications apparatus according to claim 6, wherein the plurality of time units comprise the target time unit.

8. The communications apparatus according to claim 6, wherein the plurality of time units comprise a $K^{th}$ time unit, a number of the $K^{th}$ time unit is indicated by using G bits, and the at least one second bit in the S bits comprised in a $K^{th}$ piece of identification information of the plurality of pieces of identification information sent in the $K^{th}$ time unit is N bits in the G bits.

9. The communications apparatus according to claim 8, wherein the N bits are N least significant bits in the G bits.

10. The communications apparatus according to claim 6, wherein the plurality of time units comprise a $K^{th}$ time unit, the number of the $K^{th}$ time unit is indicated by using G bits, and the at least one first bit in the S bits comprised in a $K^{th}$ piece of identification information of the plurality of pieces of identification information sent in the $K^{th}$ time unit is O bits in the G bits.

11. The communications apparatus according to claim 10, wherein the O bits are within M most significant bits in the G bits.

12. The communications apparatus according to claim 8, wherein the $K^{th}$ time unit is any one of the plurality of time units.

13. The communications apparatus according to claim 6, wherein the plurality of pieces of identification information comprise target identification information, and a scrambling code or an encoding scheme of the target identification information is different from that of other identification information of the plurality of pieces of identification information.

14. A communications apparatus, wherein the apparatus comprises:
a transceiver configured to receive a plurality of pieces of identification information in a plurality of time units, wherein the plurality of pieces of identification information are used to indicate a number of a target time unit, each of the plurality of pieces of identification information comprises S bits, and the S bits comprise at least one first bit and at least one second bit; and
a processor configured to determine the number of the target time unit based on the plurality of pieces of identification information, wherein the number of target time unit represents an index of the target time unit amongst the plurality of times units as part of identification information of the target time unit, wherein the at least one second bit comprised in one of the plurality of pieces of identification information and a combination of the at least one first bit comprised in the plurality of pieces of identification information are used to indicate the number of the target time unit.

15. The communications apparatus according to claim 14, wherein the plurality of time units comprise the target time unit.

16. The communications apparatus according to claim 14, wherein the plurality of time units comprise a $K^{th}$ time unit, a number of the $K^{th}$ time unit is indicated by using G bits, and the at least one second bit in the S bits comprised in a $K^{th}$ piece of identification information of the plurality of pieces of identification information sent in the $K^{th}$ time unit is N bits in the G bits.

17. The communications apparatus according to claim 16, wherein the N bits are N least significant bits in the G bits.

18. The communications apparatus according to claim 14, wherein the plurality of time units comprise a $K^{th}$ time unit, the number of the $K^{th}$ time unit is indicated by using G bits, and the at least one first bit in the S bits comprised in a $K^{th}$ piece of identification information of the plurality of pieces of identification information sent in the $K^{th}$ time unit is O bits in the G bits.

19. The communications apparatus according to claim 18, wherein the O bits are within M most significant bits in the G bits.

20. The communications apparatus according to claim 14, wherein the plurality of pieces of identification information comprise target identification information, and a scrambling code or an encoding scheme of the target identification information is different from that of other identification information of the plurality of pieces of identification information.

* * * * *